United States Patent
Buchsteiner, deceased et al.

[15] 3,656,362
[45] Apr. 18, 1972

[54] MOTION-CONVERTING GEARING

[72] Inventors: Hans Buchsteiner, deceased, Lindenstrasse 16, 7344 Gingen/Fils by Renate Buchsteiner, executrix; Bruno Bernhardt, Jurastrasse 47, 7411 Reutlingen-Betzingen; Hubert Kowalski, Untere Schloss-Strasse 36, 7071 Alfdorf, all of Germany

[22] Filed: Nov. 9, 1970

[21] Appl. No.: 87,885

[30] Foreign Application Priority Data
Nov. 8, 1969  Germany ............... P 19 56 250.6

[52] U.S. Cl. ............................................. 74/393, 74/84
[51] Int. Cl. ............................................. F16h 35/02
[58] Field of Search ................................. 74/84, 393

[56] References Cited
UNITED STATES PATENTS
2,656,731  10/1953  Wildhaber ..................... 74/393

FOREIGN PATENTS OR APPLICATIONS
1,114,409  12/1955  France .......................... 74/393

Primary Examiner—Milton Kaufman
Attorney—Craig, Antonelli & Hill

[57] ABSTRACT

A gearing for converting a constant rotation of its drive shaft to an intermittent rotation of its driven shaft, in which the driven shaft may be stopped and positively locked during each complete revolution of the drive shaft for any predetermined period which may last from a momentary stop to one amounting to a considerable angular distance of each revolution of the drive shaft. The transition from the stopped position to the normal speed of the driven shaft occurs very gradual and without jerks, the locking action upon the driven shaft is attained without any additional locking means, and the entire gearing is of a very simple and inexpensive construction.

6 Claims, 9 Drawing Figures

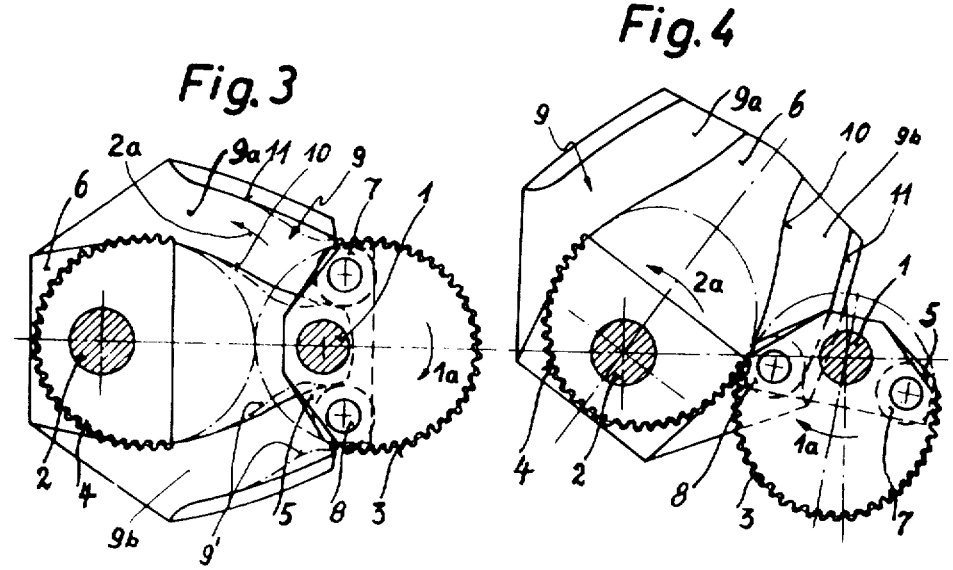
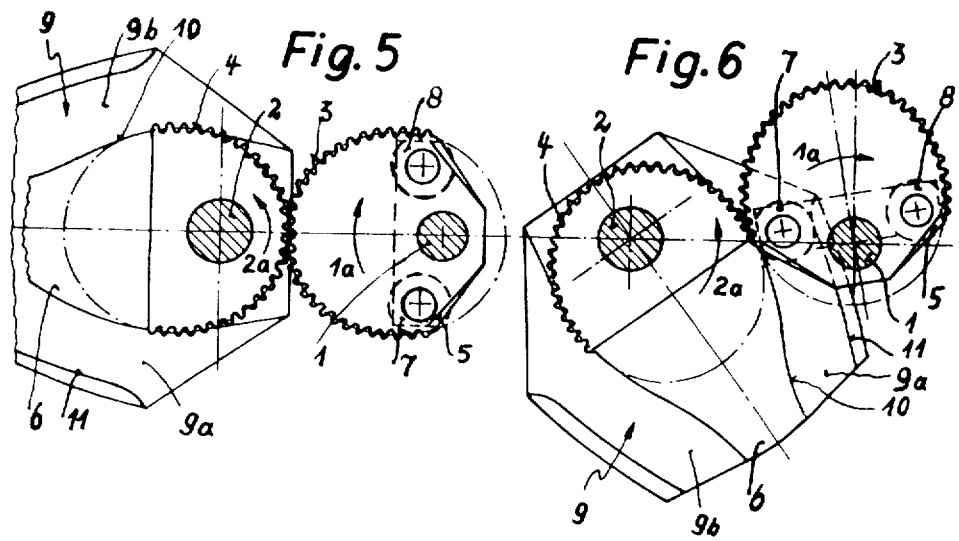

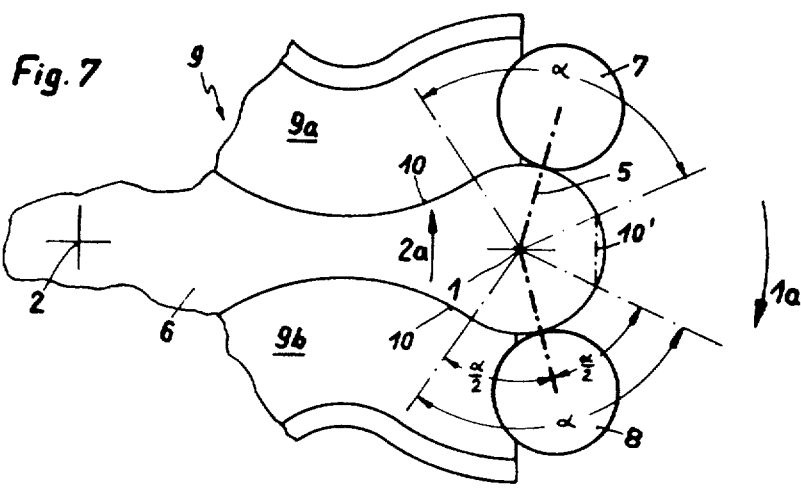
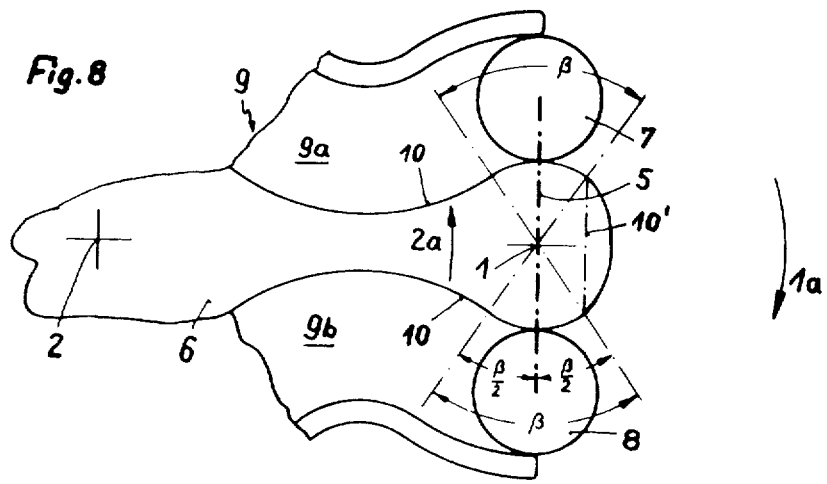
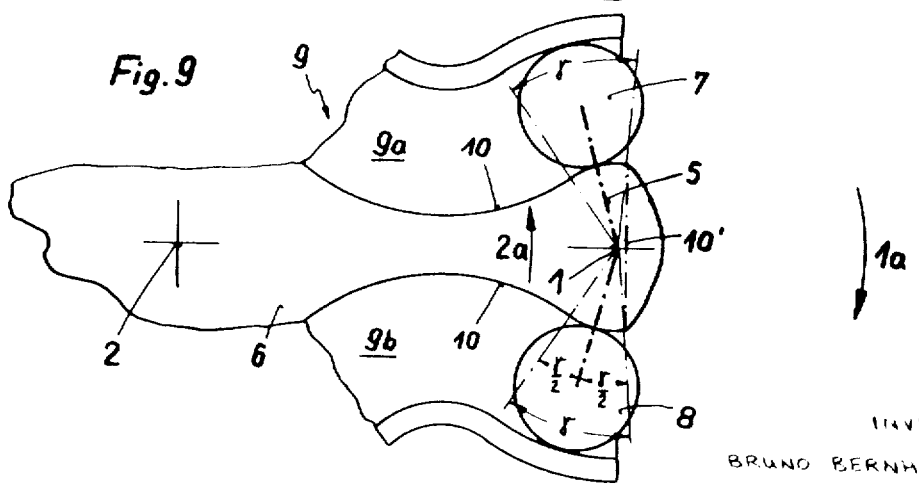

MOTION-CONVERTING GEARING

The present invention relates to a gearing for converting the constant rotation of its drive shaft to an intermittent rotation of its driven shaft. More specifically, it is an object of the invention to design such a motion-converting gearing so as to comply with all of the following requirements:

1. During each complete revolution of its constantly rotating drive shaft, the driven shaft of this gearing should be stopped entirely;
2. This stopping period of the driven shaft should be maintained accurately for any desired length of time;
3. During this stopping period, the driven shaft should be positively locked so as to prevent any movement thereof not only while the drive shaft continues to rotate but also if during this period the drive shaft also stops;
4. The transition from the common rotation of the driving and driven shafts of the gearing to the deceleration and stop of the driven shaft and the transition from the stop and acceleration of the driven shaft to the common rotation of both shafts should occur smoothly without any jerk; and
5. The gearing should be of a simple construction, as wear-resistant as possible, and capable of being subjected to relatively heavy loads.

The motion-converting gearings of the type as first mentioned above which were disclosed prior to this invention have the disadvantage that they only comply with some of the above-mentioned requirements. Thus, for example, the U.S. Pat. No. 2,656,731 discloses such a gearing which comprises a drive shaft on which a so-called mutilated drive gear is mounted which is provided with gear teeth only on a circular arc of its circumference. The drive shaft further carries a disk on which two anti-friction rollers are mounted, the parallel axes of which are disposed on diametrically opposite sides of the drive shaft and are equally spaced from the axis of this shaft. The driven shaft of this gearing carries a normal circular gear wheel with gear teeth on its entire circumference which is driven as long as its teeth are in engagement with the teeth of the mutilated drive gear. This driven shaft further carries a crank arm which projects from one side of this shaft and is provided with two parallel guide grooves at the opposite sides of an equally spaced from the axis of the crank arm and the open ends of each of these guide grooves are spaced at different distances from the driven shaft. During the period of each revolution of the drive gear in which its toothless part is out of engagement with the teeth of the gear wheel on the driven shaft, one roller on the drive shaft will enter the outer end of one guide groove and will then roll along the same, while at the same time with this entry of the first roller the other roller will leave the outer end of the other guide groove after rolling along the same. Therefore, the time when one roller leaves one guide groove coincides with the time when the other roller enters the other guide groove. Although the driven shaft of this known gearing will once be stopped at this time during each revolution of the drive shaft, this stop will only be momentary and the next teeth of the driven shaft will then again be started immediately. Therefore, this gearing does not permit the driven shaft to remain in a stopped position for a certain length of time, for example, during a period in which the drive shaft turns about an angle of up to 30° during one complete revolution thereof. Although the stopped position of the driven shaft might be extended so as to last for a certain length of time by the provision of a special clutch mechanism in the nature of a jaw clutch which disengages the cam member on the driven shaft from the rollers on the drive shaft at the moment when the driven shaft is stopped, such a mechanism is rather expensive and also, while it may be utilized for attaining longer stop periods of the driven shaft which may last, for example, for several revolutions of the drive shaft, it is not capable of attaining shorter stop periods of, for example, up to 30° of one revolution of the drive shaft. By making the associated gear wheels of a circular shape and of an interrupted or "mutilated" circular shape, respectively, the periods of transition in the motion of the driven shaft of this gearing from the decelerating and accelerating sections to the section in which it rotates together with the drive shaft because of the interengagement of the teeth of both gear wheels are very abrupt and are therefore hardly attainable without jerking.

The French Pat. No. 1,114,409 discloses a gearing which overcomes the disadvantages of the above-mentioned gearing insofar as it extends the length of the stopping period of the driven shaft by providing a single roller which, after the rotation of the driven shaft is retarded up to its stop, disengages from one of two sections and, after carrying out a rotary movement about an angle of, for example, 150°, engages with the other cam section so as to re-start and accelerate the driven shaft. In order to lock the driven shaft during the stopping period, this gearing requires additional locking disks which increase the cost of the gearing and also its susceptibility to trouble.

In order to dispense with these locking disks, the applicant of the above-mentioned French patent discloses in a subsequent French patent of addition, No. 70.645 an improvement of the gearing according to his main patent in which the driven shaft of this gearing is only provided with a single cam groove into which a single roller engages which is mounted on the drive shaft. The stopping area of this cam groove extends concentrically to the drive shaft and thus permits the continuous movement of the roller for an angular distance of, for example, 80° within which the cam element containing the cam groove and thus also the driven shaft are not taken along so that during this period the driven shaft is stopped. By designing this stopping area of the cam groove so as to extend concentrically to the drive shaft, the cam element is supposed to be locked so as to prevent its turning about the driven shaft relative to which the stopping area of the cam groove does not extend concentrically. This locking of the driven shaft during the stopping period is, however, in actual practice not as effective as it may appear theoretically since due to the necessary tolerances there remains a certain amount of free play which permits the driven shaft during the stopping period to move, for example, slightly in the reverse direction if it is acted upon by forces which tend to effect such a reverse movement. Still more important is, however, the fact that this locking action remains effective only as long as the drive shaft continues to rotate or is held locked in its stopped position. If this does not occur, the drive shaft may be turned by the driven shaft. Therefore, if the drive shaft is stopped but not locked in its stopped position, the locking action upon the driven shaft will not be effective.

Furthermore, the associated gears on the drive shaft and the driven shaft of the last mentioned gearing which interengage with each other for common rotation have a shape somewhat similar to that of an ellipse with the exception of an arcuate toothless sector between the ends of the elliptical part of each gear. The transition of the velocity curve of the gearing at each end of the toothed parts of the elliptical gears to the velocity curve of the gearing during the engagement or disengagement of the roller with or from the cam groove is tangential, as seen in a velocity diagram of the driven shaft. In this manner it is possible to effect a completely smooth transition between the common rotary movement of the two shafts and the retarding and accelerating periods in the movement of the driven shaft, respectively. Although this known gearing substantially fulfills most of the above-enumerated requirements which a gearing according to the invention should fulfill, it does not fulfill the requirement that the driven shaft be locked when it is in its stopped position and the drive shaft is also stopped but not locked in its stopped position.

It is therefore the particular object of the present invention to provide a gearing for converting the constant rotation of a drive shaft into an intermittent rotation of a driven shaft, which gearing complies with all of the requirements as mentioned in the beginning and therefore has not only all of the advantages of the last mentioned known gearing but also the advantage of positively locking the driven shaft when it is in its stopped position and when the drive shaft is also stopped but not locked in its stopped position.

For attaining this object, the invention provides such a motion-converting gearing which comprises a drive shaft and a driven shaft, a substantially elliptic drive gear secured to the drive shaft and a substantially elliptic driven gear secured to the driven shaft. Each of these gears has a toothed section and a toothless section which is connected to the beginning and end of the toothed section. These toothed sections of the two gears are adapted to interengage with each other for a common rotation of both shafts. The gearing further comprises a roller support which is secured to the drive shaft and has a pair of anti-friction rollers rotatably mounted thereon the axes of which are disposed within planes which are spaced at radial distances from the axis of the drive shaft. The driven shaft further carries a cam member which has a first decelerating curved cam groove and a second accelerating curved cam groove at opposite sides of the central longitudinal axis of the cam member. Each of these grooves has an open inner end near the driven shaft and another open outer end remote from the driven shaft, and these grooves are respectively defined by first and second outer and inner guide walls. The inner end of the first groove is adapted to receive the first roller and this groove is adapted to be guided by the first roller during its travel from the end of the toothed section of the driven gear near the axis of the driven shaft until this roller leaves the outer end of the first groove, whereby the rotation of the cam member and the driven shaft is decelerated from the common rotation up to a stopped position in which the first roller is located at the outer end of the first groove. The second groove in the cam member is adapted to receive the second roller from the stopped position at the outer end of the second groove and is adapted to be guided by the second roller into the outer end and along the second groove to the beginning of the toothed section of the driven gear near the axis of the driven shaft until it leaves the inner end of the second groove, whereby the rotation of the cam member and the driven shaft is accelerated from the stopped position to the common rotation of both shafts. When the first roller is in the stopped position of the cam member and the driven shaft is at least about to leave the outer end of the first groove, the second roller is at the same time at least about to enter the outer end of the second groove. The inner walls of both grooves have a common cam-shaped end portion which connects the outer ends of these inner walls to each other and extends in the stopped position so far between and in engagement with both rollers that the driven shaft while stopped will be positively locked for a period up to a larger than momentary part of each complete revolution of the drive shaft. The outer ends at least of the inner walls adjacent to the connecting end portion are made of a shape so that during the stopped and locked period the first roller when leaving the outer end of the first groove will engage with but not move the inner wall of the first groove, while the second roller when entering the outer end of the second groove will engage with but not move the inner wall of the second groove.

It is therefore an important feature of the invention that within the stopping period both rollers are in engagement with the outer ends of the inner cam walls and thereby exert a locking action upon the cam member and thus also on the driven shaft. At least during a substantial part of the stopping period the first roller leaving the first groove still engages with the inner wall thereof, while the second roller entering the second groove already engages with the inner wall of the second groove. During this time, the outer end portion of both inner grooves is located between and engages with the two rollers and thus locks the driven shaft against any rotary movement. If in this position the drive shaft is also stopped, it cannot possibly be moved by the driven shaft by means of the cam member. The cam member is therefore positively locked also at this time by the two rollers.

Depending upon the desired length of the stopping period, the plane intersecting the axes of the two rollers may either intersect the axis of the drive shaft or be offset from this axis in the direction toward the axis of the driven shaft. More preferably, however, this plane is located beyond the axis of the drive shaft, as seen from the axis of the driven shaft. Of course, when the two rollers are in locking engagement with the cam grooves, only the length of the inner walls is of importance upon which both rollers engage during the locking period, that is, during at least a part of the length of the desired stopping period. As regards this length, the points of contact between the rollers and the cam grooves are therefore of importance.

The radial distance between the rollers and the axis of the drive shaft is preferably made of such a size that the peripheral surfaces of the rollers are tangential to the pitch line of the toothed section of the substantially elliptic drive gear. The two substantially elliptic gears have preferably equal pitch lines. According to a preferred embodiment of the invention, the inner walls of the grooves of the cam member adjacent to the inner ends thereof are tangential to the pitch line of the toothed section of the driven gear.

The operation of the gearing according to the invention proceeds as follows: Assuming that the driven shaft is in its stopped position, it will at first be driven by the rollers engaging with the cam member until the substantially elliptic tooth sectors of the two gears engage with each other. The acceleration and deceleration of the driven shaft are therefore effected by the cam member in cooperation with the rollers. The greatest load may, of course, be taken up by the toothed sections of the gears. Due to the fact that the transition of the velocity line of the cam grooves into the velocity line of the substantially elliptic gear segments occurs tangentially, the transition between the accelerating or decelerating periods and the common rotation of both shafts occurs smoothly and without jerking. By making the cam grooves of a suitable shape, it is also possible to effect the transition between the deceleration of the driven shaft and the stopping period and the restarting and subsequent acceleration of the driven shaft to be smooth and without any jerking.

The gearing according to the invention is preferably designed to attain stopping periods of the driven shaft amounting to about 10 percent of one complete revolution of the drive shaft. It is, however, also possible to attain considerably longer stopping periods during each revolution of the drive shaft. A very secure locking effect during the particular stopping period as desired may be attained by making the outer ends of the inner cam walls of a suitable shape, and by making the distance between the plane intersecting the axes of the rollers and the axis of the drive shaft and also the distance between the foci of the ellipses of the substantially elliptical gears of suitable sizes. Depending upon the particular shapes and dimensions of the mentioned parts which might be chosen, it is possible to attain any desired velocity line of the motions of the driven shaft so that the speeds of the individual parts of the rotation of the driven shaft and the length of its stopping periods may be varied so as to be in accordance with the desired conditions.

An important advantage of the present invention is also the fact that the locking action as previously described may be attained without any additional locking means, such as locking disks or the like, as were required prior to this invention, that the entire gearing is of a very simple, inexpensive, and reliably operating construction, that it may be made of a small size and low weight, be built economically even if only a small number of these gearings are required for a particular purpose, and be easily designed for being installed in and employed for the operation of many different machines.

It is another feature of the present invention that it permits the roller support on the drive shaft which of the drive gear to be provided in the form of a worm wheel with which a worm shaft engages which is driven by a motor or other driving means. In this manner it is possible to attain a very slow intermittent rotation of the driven shaft. The torques which are to be reduced during the deceleration of the driven shaft may then be taken up by the worm shaft. This is especially of importance if very strong torques acting upon the driven shaft are to be controlled.

The gearing according to the invention permits the complete torque to be transferred in any position of the rotation of the gearing because no critical position occurs. During the stopping period of the driven shaft the motor driving the gearing may be easily retarded or switched off, especially if this motor is a brake motor of a conventional type. The driven shaft is then locked by means of the two rollers. If a timing relay is then employed, the stopping periods may be made of any desired lengths and be maintained very accurately.

The features and advantages of the present invention will become further apparent from the following detailed description thereof which is to be read with reference to the accompanying diagrammatic drawings, in which.

Figure 1:
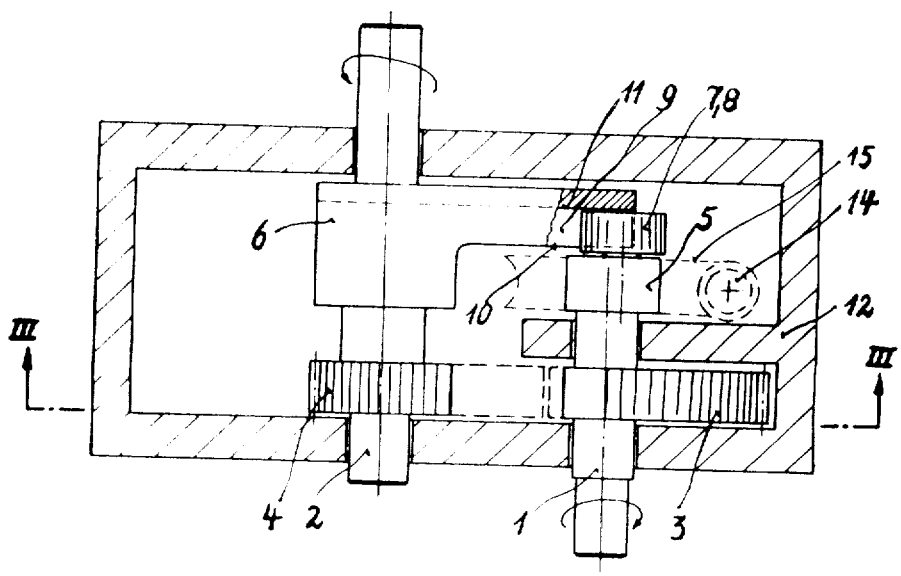
FIG. 1 shows a horizontal section of a gearing according to the invention, as seen from above.

FIGS. 3 to 6 show cross sections which are taken approximately along the line III — III of FIG. 1 and in which FIG. 3 shows the gearing without its housing in the stopped position of its driven shaft; FIG. 4 in the position in which the first teeth of the two elliptic gears engage with each other, FIG. 5 in a central position of engagement of the elliptic gears, and FIG. 6 in the position in which the last teeth of the elliptic gears engage with each other; while FIGS. 7 to 9 show enlarged diagrammatic elevations of three modifications of parts of the gearing according to the invention.

As illustrated in the drawings, the motion-converting gearing according to the invention comprises a gear housing 12, as shown in FIG. 1, in which a drive shaft 1 and a driven shaft 2 are rotatably mounted. Drive shaft 1 which may rotate at a uniform speed either in the clockwise or counterclockwise direction carries a substantially elliptic gear 3 and a roller support 5 which, in turn, carries two opposite anti-friction rollers 7 and 8. The driven shaft 2 likewise carries a substantially elliptic gear 4 which has the same size and shape as the gear 3, and a cam member 6 which is provided with a cam track 9 which is composed of two cam grooves 9a and 9b which extend symmetrically to the central longitudinal plane of cam member 6 and are defined by inner cam walls 10 and outer cam walls 11. As indicated by the diagram in FIG. 2, the gearing is designed so that the velocity line W of each cam groove 9a and 9b merges tangentially into the velocity line H of the elliptic gear 4. The entire velocity ratio during one revolution therefore extends in the form of a sinusoidal curve.

When the gearing is in the stopped or basic position as shown in FIG. 3, the centers of the toothless sections of the elliptic gears 3 and 4 face each other and the two opposite rollers 7 and 8 engage upon the outer ends of the inner cam walls 10. If the drive shaft 1 is then turned, for example, in the clockwise direction, as indicated by the arrow 1a, roller 8 will pass into the outer end of the cam groove 9b and during the further rotation of drive shaft 1, roller 8 will take along the cam member 6 in the direction of the arrow 2a by rolling along the inner cam wall 10 of cam groove 9b until the teeth of the elliptic gears 3 and 4 interengage with each other, as shown in FIG. 4.

During the further rotation of drive shaft 1, the driven shaft 2 will be driven by the engagement of the teeth of gears 3 and 4 until these gears are turned to the position as shown in FIG. 6 and the other roller 7 enters the inner end of the other cam groove 9A. During the further rotation of drive shaft 1, roller 7 will roll along and act upon the outer cam wall 11 of cam groove 9a and take along the cam disk 6 in the direction of the arrow 2a until the gearing arrives again in its basic position as shown in FIG. 3. This cycle of the motions of the driven shaft 2 is repeated during each complete revolution of drive shaft 1 during which the driven shaft 2 first starts to move gradually from its stopped position and then accelerates until the teeth of the two gears 3 and 4 engage with each other, and when the teeth of the two gears again disengage, the driven shaft 2 decelerates until it arrives again in its basic stopped position.

In order to attain a smooth transition between the cam grooves and the toothed parts of the gears 3 and 4, the central longitudinal plane of the cam disk 6 is disposed within the common plane connecting the axes of the two shafts 1 and 2 when the gearing is in the position as shown in FIG. 3, while the plane connecting the axes of the two rollers 7 and 8 extends at a right angle to the first mentioned plane. The inner cam walls 10 of the two cam grooves 9a and 9b extend tangentially from the pitch line of the toothed part of the elliptic gear 4. Cam disk 6 and thus also the cam walls 10 and 11 then extend further up to a line which is located beyond the drive shaft 1. The inner cam walls 10 approach each other so far that between the rollers 7 and 8 they extend tangentially to the outer diameter of these rollers, while the outer cam walls 11 are spaced from the corresponding points of the inner cam walls 10 at a distance which is substantially equal to the diameter of the rollers 7 and 8.

The radial distance of the rollers 7 and 8 from the axis of drive shaft 1 is made of such a size that the outer diameter of the rollers 7 and 8 is tangential to the pitch line of the associated elliptic gear 3. The plane extending through the axes of the two rollers 7 and 8 may then extend through the axis of drive shaft 1 or it may be located at one or the other side of this axis.

Due to the tangential transition of the movable elements of the gearing into and out of engagement with each other, all of the motions of the gearing are very smooth and occur without any jerking and the gearing therefore operates almost without noise.

The gearing according to the invention may be very easily designed so that the stopping period of the driven shaft 2 may last for a rotary movement of the drive shaft 1 for an angular distance between 0° and 30° and more of one complete revolution thereof and, for example, to about 10 percent of such a revolution. This stopping period is attained by making the cam grooves 9a and 9b and their walls 10 and 11 of a suitable shape, by making the distance between the common plane of the axes of rollers 7 and 8 and the axis of drive shaft 1 of a suitable size, and by making the gears 3 and 4 of a suitable elliptical shape or by spacing the foci of their ellipses at a suitable distance from each other. If the rollers 7 and 8 as seen in their position according to FIG. 3 are spaced at a still greater distance from the axis of drive shaft 1 and the cam grooves are shaped accordingly, and if the drive shaft 1 is then turned in the clockwise direction of the arrow 1a, roller 8 will not take the cam disk 6 along as quickly as it would do if it was spaced at a smaller distance from the axis of drive shaft 1. Consequently, the gearing may be designed so as to attain stopping periods of different lengths.

Figure 2:
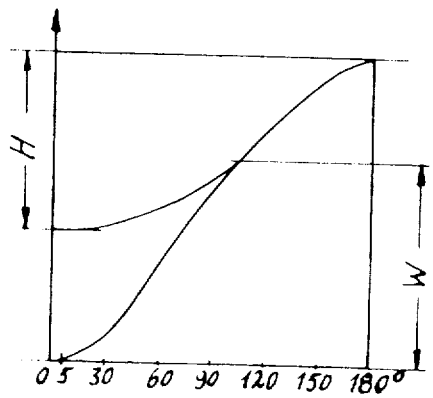
FIG. 2 shows a diagram of the velocity line of the elliptic driven gear and of the velocity line of the cam member.

In the velocity diagram according to FIG. 2, the stopping period lasts, for example, for an angular distance of about 5° of one revolution of drive shaft 1 from the position as shown in FIG. 3. This period may be either increased or reduced so as to last for an angular distance of about 0 to 10 percent and more of one complete revolution of drive shaft 1. The cam grooves 9a and 9b are then to be designed accordingly and must always start from the pitch line of the elliptic gear 4. The longer the stopping period is to be made, the more rapidly and closely the cam grooves 9a and 9b must approach each other toward their plane of symmetry. This may be extended until the material between the two cam grooves 9a and 9b becomes too thin for practical purposes at both sides of the central longitudinal plane of the cam member 6. An example of the shape of the cam grooves which results in a longer stopping period is indicated in dot-and-dash lines at 9' in FIG. 3.

For a smooth operation of the gearing according to the invention it is important that, when, for example, the roller 8 enters the cam groove 9b, it will immediately engage with the inner cam wall 10 of this groove without, however, at first moving the same. For a certain length of the stopping period, the inner cam walls therefore extend so far between the two rollers 7 and 8 that the cam member 6 will be locked so as to prevent any independent rotary movement of its own. If the stopping period amounts to about 5° of one revolution, as provided for in FIG. 3, this length of the two cam grooves 9a and 9b in which both rollers are in engagement with the inner cam walls 10 is very short and it is therefore hardly noticeable in this drawing. FIGS. 7 to 9 show enlarged illustrations of the principle according to which the roller which is to enter the respective outer end of a cam groove will at first engage with the inner wall thereof without, however, at first moving the same.

The drive shaft 1 and the driven shaft 2 are only indicated diagrammatically in FIGS. 7 to 9, while for a clearer illustration the gear segments are omitted therein entirely. Together with the drive shaft 1 the roller support 5, as indicated by heavy dot-and-dash lines, revolves, for example, in the same manner as shown in FIG. 3, that is, in the direction of the arrow 1a. On this roller support 5 the rollers 7 and 8 are rotatably mounted. The plane which connects their axes extends in FIG. 7 at the side beyond the axis of drive shaft 1, as seen from the driven shaft 2, in FIG. 8 it extends through the axis of drive shaft 1, while in FIG. 9 it extends at the left side of the axis of drive shaft 1. Although the cam grooves 9a and 9b are made of a different shape, the dimensions of the different parts as shown in FIGS. 7 to 9 are enlarged to twice their sizes as shown in FIG. 3.

The rollers 7 and 8 are shown in each of FIGS. 7 to 9 in a symmetrical position which corresponds to the center of a stopping period. In FIG. 7, both rollers 7 and 8 will engage simultaneously within an angle $\alpha$ of 100° upon the inner cam walls 10. During the outward movement of roller 7, the other roller 8 entering the cam groove 9b will at first not move the inner cam wall 10 of groove 9b, but only after it has traveled for the distance of an angle $\alpha/2 = 50°$ from the position as shown in FIG. 7. Cam member 6 will therefore not be taken along by the roller 8 until this time and it will then be moved in the direction of the arrow 2a about the driven shaft 2. The arrangement according to FIG. 7 therefore permits the stopping period to last for an angular distance of 100° of one revolution of drive shaft 1. During this period, both rollers 7 and 8 engage upon the inner cam walls 10. Since the inner cam walls 10 including their outer connecting end then project between and engage with both rollers 7 and 8, any rotary movement of cam member 6 relative to the driven shaft 2 will be prevented and the latter is positively locked.

In FIG. 8, the angle $\beta$ within which both rollers 7 and 8 may engage upon the cam walls and prevent any rotary movement of the driven shaft 2 amounts to 70°, while in FIG. 9 this angle $\gamma$ amounts to 40°. The outer end portion of the inner cam walls 10 according to FIGS. 8 and 9 which connects these walls to each other is made of a flatter shape than that in FIG. 7 in order to effect the proper rolling movement. In any event, the locking action will be effective only during the angular distance of $\alpha$, $\beta$ or $\gamma$. This locking action would therefore not be effected if the outer end portion which connects the two cam walls 10 to each other would be cut off, along the line 10' as indicated by a dot-and-dash line in each of FIGS. 7, 8 and 9. If a shorter stopping period or a shorter locking period during the stopping period is desired, this may be easily attained by varying the shape of the inner cam walls 10 accordingly. The outer end portion may then be cut off to a still greater extent than indicated by the line 10' in FIG. 9.

The desired length of the decelerating and accelerating periods may also determine the particular shape of the elliptic gears 3 and 4. The smaller the distance is made between the two foci of the ellipse of each of these gears, the shorter will be the accelerating and decelerating periods, although the smaller will also be the load to which the gearing may be subjected. The smallest possible distance between the foci is therefore determined by highest admissible slope of the entire velocity line, as indicated in FIG. 2, while the largest possible distance between the foci is determined by the highest admissible distortion of the profile of the teeth of the elliptic gears 3 and 4. By making the cam track 9, the roller support 5 together with the rollers 7 and 8, and the distance between the foci of the ellipse of each gear 3 and 4 of suitable dimensions, it is therefore possible to design the gearing according to the invention without any difficulty in accordance with the particular requirements which it should fulfill.

As already indicated, the new gearing may also be driven in either direction and the driven shaft may therefore also rotate intermittently either in the clockwise or counterclockwise direction. Consequently, the new gearing may also be employed as a reversible gearing.

It is a further important advantage which may be attained by the present invention that, if the roller support 5 is provided in the form of a worm wheel 15, as indicated in dotted lines in FIG. 1, which is mounted on the shaft 1 carrying the gear 3, the gearing may also be driven by means of an associated worm shaft 14 which is connected to the driving motor or other driving means. In this manner it is possible to reduce the speed of rotation of the gearing according to the invention considerably, while the full torque will be taken up by the worm gear in any position of the rotation of the gearing according to the invention and the braking couples will be taken up by the worm shaft 14.

If the worm shaft 14 is driven by a brake motor of a conventional type, this motor will also be stopped without a load during the stopping period of the driven shaft of the gearing. This means that during the stopping period of the driven shaft of the gearing the brake motor may be switched off so that the gearing may also be stopped entirely. By means of a timing relay it is then possible to switch on the motor again automatically at any desired time.

From the foregoing description it is evident that the motion-converting gearing according to the invention is applicable in different manners and for many different purposes and also at different speeds and different stopping periods of its driven shaft which may last from zero to any desired length of time, and also by rotating its driven shaft after each stopping period either in the same direction as previously or in the opposite direction.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A motion-converting gearing comprising a drive shaft and a driven shaft and adapted to convert a constant rotation of said drive shaft into an intermittent rotation of said driven shaft, a substantially elliptic drive gear secured to said drive shaft, a substantially elliptic driven gear secured to said driven shaft, each of said gears having a toothed section and a toothless section connected to the beginning and end of said toothed section, said toothed sections adapted to interengage with each other for common rotation of both shafts, a roller support secured to said drive shaft, a pair of rollers rotatably mounted on said support and having axes within planes spaced at radial distances from the axis of said drive shaft, and a cam member secured to said driven shaft and having a first decelerating curved cam groove and a second accelerating curved cam groove at opposite sides of the central longitudinal axis of said cam member, each of said grooves having an open inner end near said driven shaft and another open outer end remote from said driven shaft and being respectively defined by first and second outer and inner guide walls, said first groove at its inner end adapted to receive said first roller and to be guided by the same from the end of said toothed section of said driven gear near the axis of said driven shaft until it leaves the outer end of said first groove and for thereby decelerating the rotation of said cam member and driven shaft from said common rotation up to a stopped position at said outer end of said first groove, said second groove adapted to receive said second roller from said stopped position at said outer end of said second groove and to be guided by said second roller into said outer end and along said second groove to the beginning of said toothed section of said driven gear near the axis of said driven shaft until it leaves said inner end of said second groove and for thereby accelerating the rotation of said cam member and driven shaft from said stopped position to said common rotation, said first roller in said stopped position of said cam member and driven shaft being at least about to leave said outer end of said first groove, while at the same time said second roller is at least about to enter said outer end of said second groove, said inner walls of both grooves having a common cam-shaped end portion connecting the outer ends of said inner walls to each other and extending in said stopped position so far between and in engagement with both of said two rollers that said driven shaft while stopped will be positively locked for a period up to a larger than momentary part of each complete revolution of said drive shaft, said outer ends at least of said inner walls adjacent to said connecting end portion having a shape so that during said stopped and locked period said first roller when leaving said outer end of said first groove will engage with but not move said inner wall of said first groove, while said second roller when entering said outer end of said second groove will engage with but not move said inner wall of said second groove.

2. A motion-converting gear as defined in claim 1, in which in said stopped position a plane intersecting the axes of said rollers is located beyond the axis of said drive shaft, as seen from the axis of said driven shaft.

3. A motion-converting gear as defined in claim 1, in which said rollers are radially spaced from the axis of said drive shaft at such a distance that the peripheral surfaces of said rollers are tangential to the pitch line of the toothed section of said substantially elliptic drive gear.

4. A motion-converting gearing as defined in claim 1, in which said toothed parts of said substantially elliptic gears have equal pitch lines.

5. A motion-converting gearing as defined in claim 1, in which said inner walls of said grooves of said cam member adjacent to the inner ends thereof are tangential to the pitch line of said toothed section of said driven gear.

6. A motion-converting gearing as defined in claim 1, in which said roller support forms a worm wheel, and further comprising a worm shaft engaging with said worm wheel for driving said drive shaft.

* * * * *